(12) United States Patent
Giraud et al.

(10) Patent No.: US 7,974,611 B2
(45) Date of Patent: Jul. 5, 2011

(54) METHOD, APPARATUS OR SOFTWARE FOR MANAGING A CALL IN A TELECOMMUNICATIONS NETWORK

(75) Inventors: Armand Giraud, Grenoble (FR); Pau Mari Sanchez, Barcelona (ES); Ngoc-Quyen Nguyen, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 352 days.

(21) Appl. No.: 12/297,595

(22) PCT Filed: Apr. 18, 2007

(86) PCT No.: PCT/EP2007/053792
§ 371 (c)(1),
(2), (4) Date: Jan. 9, 2009

(87) PCT Pub. No.: WO2007/122164
PCT Pub. Date: Nov. 1, 2007

(65) Prior Publication Data
US 2009/0170470 A1   Jul. 2, 2009

(30) Foreign Application Priority Data

Apr. 20, 2006  (EP) ..................................... 06300379

(51) Int. Cl.
*H04M 11/00* (2006.01)
*H04W 40/00* (2009.01)

(52) U.S. Cl. .......................... 455/417; 455/406; 455/445
(58) Field of Classification Search .................. 455/406, 455/412, 415–419, 445, 466; 370/352
See application file for complete search history.

(56) References Cited

U.S. PATENT DOCUMENTS

| 5,752,188 A * | 5/1998 | Astrom et al. ................ 455/433 |
| 5,966,652 A * | 10/1999 | Coad et al. .................... 455/415 |
| 6,853,636 B1 * | 2/2005 | Merchant ...................... 370/352 |

FOREIGN PATENT DOCUMENTS

| GB | 2 342 536 | 4/2000 |
| WO | WO 9620572 A1 * | 7/1996 |
| WO | WO 9809463 A2 * | 3/1998 |
| WO | WO-2005/122541 | 12/2005 |

* cited by examiner

*Primary Examiner* — Kent Chang
*Assistant Examiner* — Kashif Siddiqui

(57) ABSTRACT

A method, apparatus and software is disclosed for managing a call in a telecommunications network, in which an instruction from a calling device to establish a call to a destination is received; a first command to connect a first call leg to the calling device is issued; the first call leg to the calling device is connected; a second command to connect a second call leg to the calling device is issued; the second call leg is connected to the destination instead of the calling device; and the first and second call legs are connected to provide the call between the calling device and the destination.

13 Claims, 4 Drawing Sheets

METHOD, APPARATUS OR SOFTWARE FOR MANAGING A CALL IN A TELECOMMUNICATIONS NETWORK

FIELD OF INVENTION

The present invention relates to a method, apparatus or software for managing a call in a telecommunications network.

BACKGROUND OF THE INVENTION

When a mobile communications device, such as mobile telephone, is used outside the coverage of its home network, it is referred to as a roaming device. Generally, a roaming device can be used to make calls via a visited network as if it were within the coverage of its home network. This is possible because the visited and home networks are arranged to allow such calls and to co-operate with call management. One protocol used to enable such co-operation is the Customised Applications for Mobile Enhanced Logic (CAMEL) protocol, which enables a full range of Intelligent Network (IN) services from a home network to be accessed via a visited network. One such service is making calls on a visited network from a prepaid mobile device.

However, some visited networks are not enabled with the CAMEL technology. In these networks, prepaid calling by visiting mobile devices can to be carried out using a different mechanism that makes use of a technology called Unstructured Supplementary Service Data (USSD). USSD is built into the Global System for Mobile Communications (GSM) standard. USSD commands are routed back to the home mobile network's Home Location Register (HLR), so as to provide access to IN services from the home network to a roaming mobile device.

The Home Location Register (HLR) is a database that contains mobile subscriber information for the home network's subscriber base. HLR subscriber information includes the International Mobile Subscriber Identity (IMSI), service subscription information, location information, service restrictions and supplementary services information. The HLR handles signalling transactions with both Mobile Switching Centres (MSCs) and Visited Location Registers (VLRs), which either request information from the HLR or update the information contained within the HLR. The HLR also initiates transactions with VLRs to complete incoming calls and to update subscriber data.

When the HLR receives a USSD call instruction from a roaming prepaid mobile device, the HLR forwards the instruction to a network element called a USSD Call Back Gateway (CBGW). The CBGW is arranged set up roaming prepaid calls in a particular way (detailed below) which enables the current prepaid credit for the mobile device to be properly monitored against the instructed call so that it can be accurately charged. The CBGW uses a network element called a Service Control Platform (SCP) in the control and charging of such calls.

In response to a USSD instruction from a prepaid mobile device (A) to set up a call to a called party (B), the following steps are carried out:

The CBGW first sets up a call to the mobile device A and the MSC triggers the SCP to monitor this first call leg;

The prepaid account balance for the mobile device is then checked and if it is sufficient, call processing continues;

When the mobile device A is reached, a call is set up to the called party B. When the call to the called party is answered, the two calls are bridged and the MSC triggers the SCP to monitor this second call leg;

The call legs are then monitored by the SCP to collect data to enable the calls to be charged appropriately.

In order to charge the call the SCP needs: the telephone numbers of both the mobile device (A) and the called party (B); the physical network location of the mobile device (A); and the call duration of the call to B. However, because the location of the mobile device (A) is only sent in the initial set-up command (Initial Detection Point (IDP)) for the call leg to the mobile device (A), this location data is not available to the SCP. Furthermore, the duration of the call to the called party (B) can only be recorded accurately by monitoring the second call leg. This is because the first call leg to the mobile device A is connected before the call to B is connected. Therefore, the call to A will be longer than the call to B and only the duration of the call to B will provide an accurate record of the duration for the bridged call. Therefore, in order to collect the data for charging the call, it is necessary to correlate the monitoring data for both legs of the call. In order to achieve this, identifiers need to be attached to the monitoring data for each call leg and the monitored data then passed to the same SCP for correlation. These restrictions have significant implementation and running costs.

SUMMARY OF THE INVENTION

An embodiment provides a method for managing a call in a telecommunications network, the method comprising the steps of:

a) receiving an instruction from a calling device to establish a call to a destination;

b) issuing a first command to connect a first call leg to the calling device;

c) connecting the first call leg to the calling device;

d) issuing a second command to connect a second call leg to the calling device;

e) connecting the second call leg to the destination instead of the calling device; and f) connecting the first and second call legs to provide the call between the calling device and the destination.

In step d) the command may comprise location data representing the location of the device. The method may further comprise the step of monitoring the duration of the second call leg for use in combination with the location data, for charging the connected call. The device may be a roaming prepaid device. The instruction may be a USSD Call-back instruction.

Another embodiment provides apparatus for managing a call in a telecommunications network, the apparatus being operable to:

receive an instruction from a calling device to establish a call to a destination;

issue a first command to connect a first call leg to the calling device; connect the first call leg to the calling device;

issue a second command to connect a second call leg to the calling device; connect the second call leg to the destination instead of the calling device; and connect the first and second call legs to provide the call between the calling device and the destination.

A further embodiment provides a method for managing a call in a telecommunications network in response to an instruction from a roaming prepaid device to establish a call to a destination, the method comprising the steps of:

a) in response to a first command, connecting a first call leg to the calling device;

b) in response to a second command, connecting a second call leg to the calling party, the second command including location data representing the location of the device;

c) connecting the second call leg to the destination instead of the calling device; and d) monitoring the duration of the second call leg in combination with the location data to charge the call against the prepaid device.

Another embodiment provides a method for managing a call in a telecommunications network in response to an instruction from a roaming prepaid device to establish a call connection to a destination, the method comprising the steps of:

a) issuing a first command for connecting a first call leg to the calling device;

b) issuing a second command in the form of a command to connect a second call leg to the calling party, but the second command being arranged to connect the second call leg to the destination instead of the calling device;

c) including location data representing the location of the device in the second command so as to enable charging the call against the prepaid device by monitoring the duration of the second call leg in combination with the location data; and d) issuing a bridging command for the first and second call legs so as to enable the call between the calling device and the destination.

A yet further embodiment provides software arranged to enable a programmable device or group of such devices to carry out any of the above method steps or to provide any of the above the apparatus.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
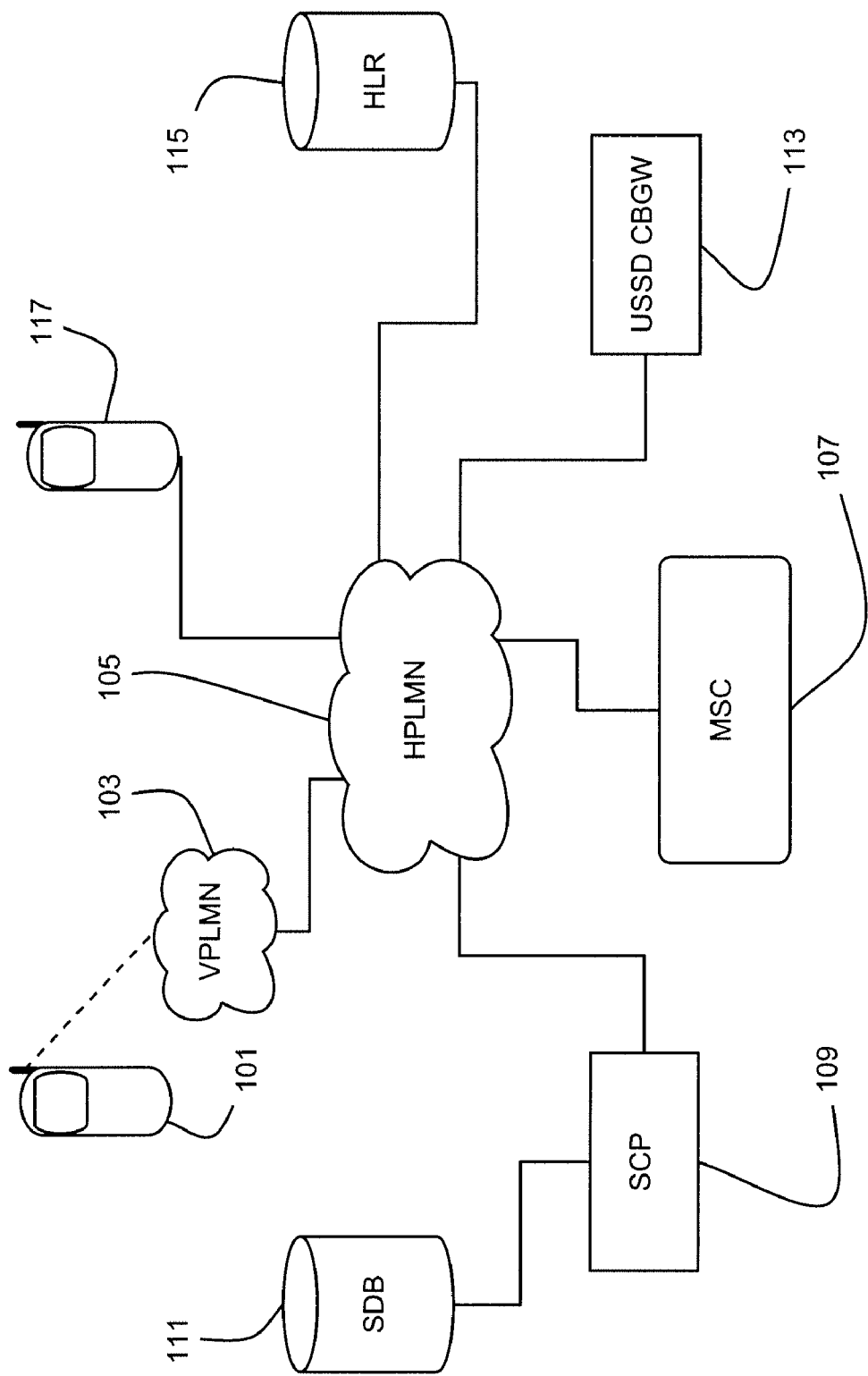
FIG. 1 is a schematic illustration of a telecommunications network.

With reference to FIG. 1, a mobile device 101, in the form of a mobile telephone, is roaming on a visited telephone network in the form of a visited private land mobile network (VPLMN) 103. The VPLMN is connected to the home network for the mobile device 101 in the form of a home private land mobile network (HPLMN) 105. The HPLMN comprises a number of interconnected network elements in the form an MSC 107, an SCP 109 connected to a Subscriber Database (SDB) 111, a USSD CBGW 113 and a HLR 115. Both the VPLMN 103 and the HPLMN 105 are GSM networks and are therefore also USSD enabled.

When the user of the mobile device 101 initiates a call to a destination in the form of another telephone 117, the mobile device 101 sends a USSD message to the HLR 115 and thereby to the CBGW 113 of the home network 105. The USSD message transports a string, which instructs a call to be made to a destination number. For example, the string "#321#12345678" instructs the USSD CBGW 113, via the call connection instruction code "321", to connect a call from the mobile device 101 to the phone number "4412345678". In response to such a USSD instruction, the following steps are carried out:

The CBGW 113 sets up a first call leg to the mobile device 101;

When the mobile device 101 is reached, the MSC 107 triggers the SCP 109 to check the prepaid account balance for the mobile device 101 via the SDB 111;

If there is sufficient balance in the account, the CBGW 113 initiates a second call leg to the called party 117. However, the call initiation instruction is in the form of a call to the mobile device 101. This instruction contains a special code, designed to be recognised by the SCP receiving the instruction;

The SCP 109 recognises the special code and thus connects the second call leg correctly as a call to the called party 117.

The first and second call legs are bridged by the CBGW 113.

When the called party 117 is reached, the MSC 107 triggers the SCP 109 to monitor the calls;

The second call leg to the called party 117 is then monitored by SCP and charged accordingly to the prepaid account of the calling party.

Initiating the second call leg in the reverse direction means that the SCP 109 is provided with the location data for the mobile device 101. This location data is normally only contained in the initial instruction (IDP) setting up the first call leg to the calling party 101. The SCP 109 is arranged to identify a special code in the instruction that initiates the second call leg and in response to this special code, connects the second call leg to the called party 117 instead of the calling party. This process results in all of the data required to accurately charge the call, in the form of the mobile device location and the second call leg duration, being held by the SCP 109 in the instructions relating to the second call leg only. Therefore, there is no need to correlate data from the two call legs in order to charge the call and the monitoring and charging process can be handled by a single SCP. Also, when the first call leg is set up, the checking of the account balance by the SCP 109 allows early release of the call if the balance is insufficient, before the resources needed for the call are reserved in the network.

The processing carried out by the CBGW 113, MSC 107 and the SCP 109 in providing a call from the mobile device 101 to the called device 117 will now be described further with reference to the call flows illustrated in FIGS. 2, 3 and 4. Four different protocols provide the instructions and messaging in these call flows. The first protocol is the USSD protocol, which enables USSD commands to be routed from the roaming mobile device 101 to the HLR 115. The second protocol is the Intelligent Network Application Part (INAP) protocol, which provides communication between the MSC 107 and the SCP 109. The third protocol is the Transaction Capability Application Part (TCAP) protocol, which provides communications between the MSC 107 and the SCP 109 for monitoring call transactions. The fourth protocol is the Isdn (Integrated Services Digital Network) User Part (ISUP) protocol, which is used between the HPLMN 105, the CBGW 113 and the MSC 107 to establish and tear down calls. ISUP is also used between the HPLMN 105 and VPLMN 103.

Figure 2:
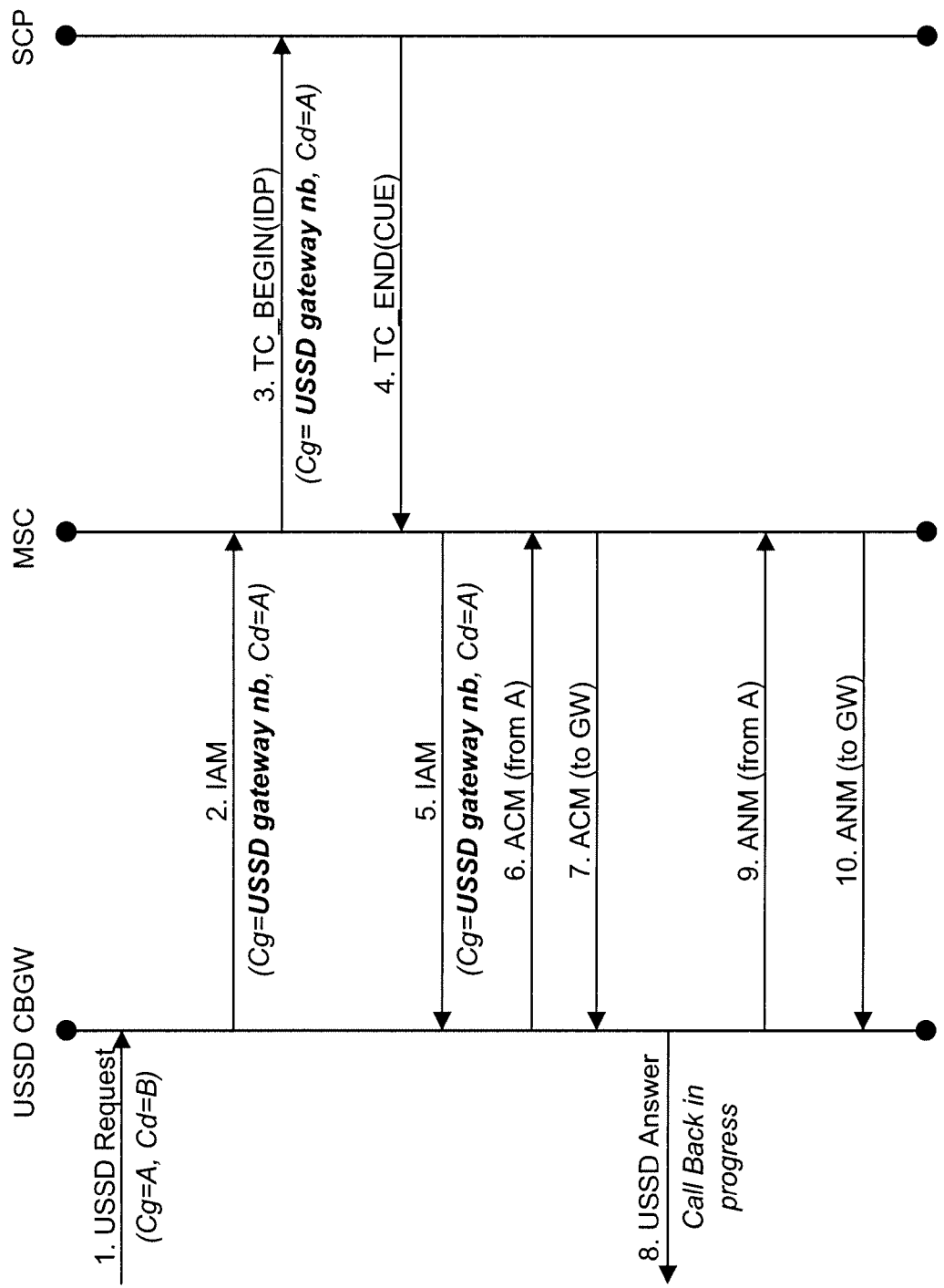
FIGS. 2, 3 and 4 are call flow diagrams illustrating the processing carried out by elements of the network of FIG. 1.

With reference to FIG. 2, at step 1, the original USSD call request arrives at the CBGW 113 from the roaming mobile device 101. This request identifies the calling party (Cg=A) and the called party (Cd=B) where A and B are the telephone numbers of the mobile device 101 and the called device 117 respectively. The CBGW 113 responds at step 2 to the USSD Request by issuing an Initial Address Message (IAM) to the MSC 107 which indicates a new call, from the CBGW to the calling party A, and requests the MSC 107 to route the call and reserve a voice time slot for it. This call is the first leg of the call being set up. In response to the IAM, at step 3 the MSC 107 issues a Transaction Begin (TC_BEGIN) message to the SCP 109. The TC_BEGIN message indicates to the SCP 109 the start of a transaction for the SCP 109 to monitor and control. The TC_BEGIN message identifies the transaction as the call between the CBGW 113 and the calling party A, that is, the first leg of the call. In response to this message, the SCP 109 does not monitor the call and responds at step 4, with a Transaction End (TC_END), which indicates the end of the transaction. At step 5, the MSC 107 acknowledges the IAM message sent in step 2 by the CBGW 113 indicating that the call has been set up.

In steps 6 and 7 the CBGW 113 and the MSC 107 exchange Address Complete Messages (ACM) messages, which acknowledge that there are enough digits to connect the call. At step 8, the CBGW 113 sends a USSD message back to the mobile device 101 indicating that the call process is in progress. In response to the mobile device 101 answering, the CBGW 113 and the MSC 107 exchange Answer Messages (ANM) at steps 9 and 10 indicating that the call from the CBGW 113 to the calling party A has been answered.

Figure 3:
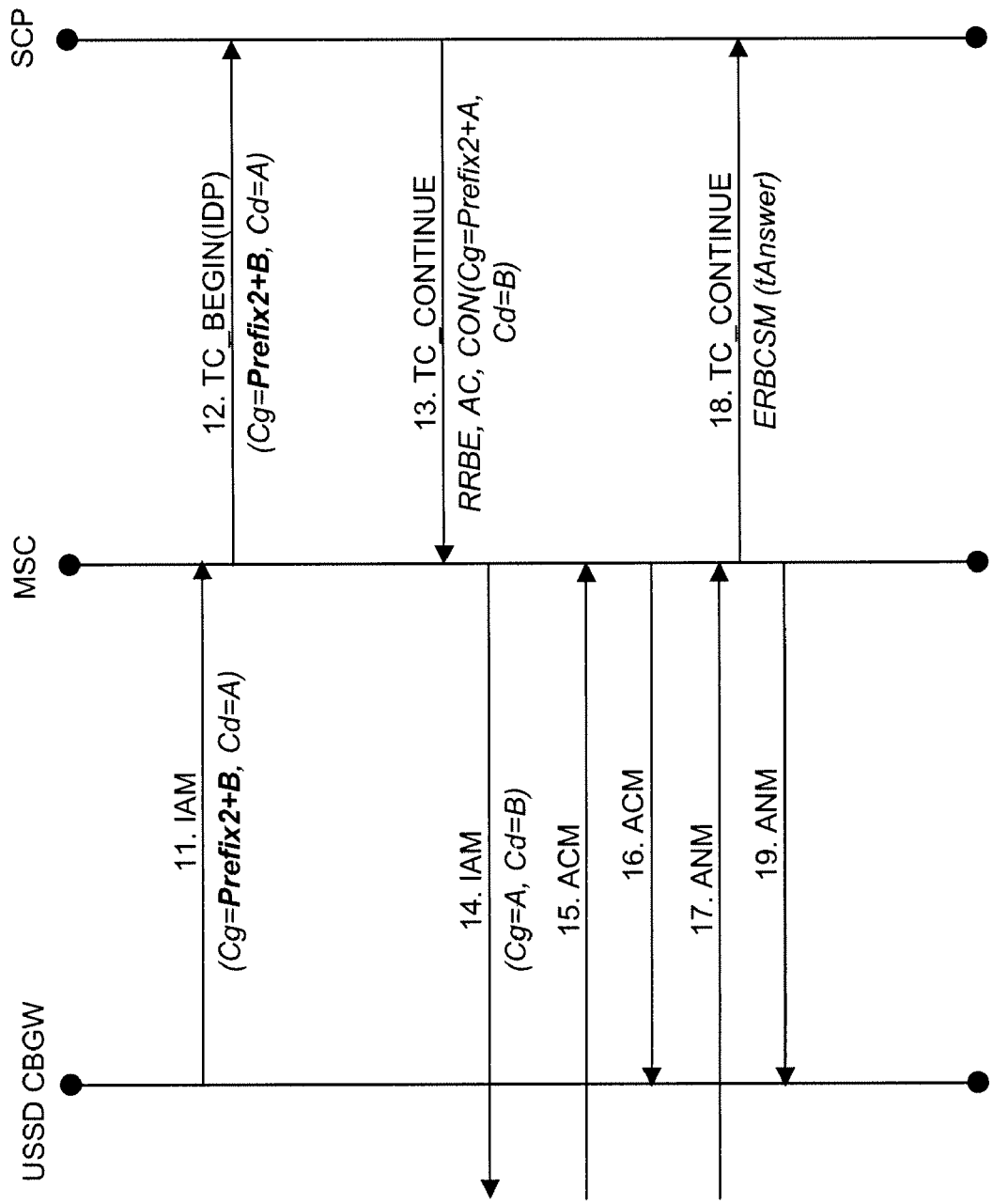
Figure 4:
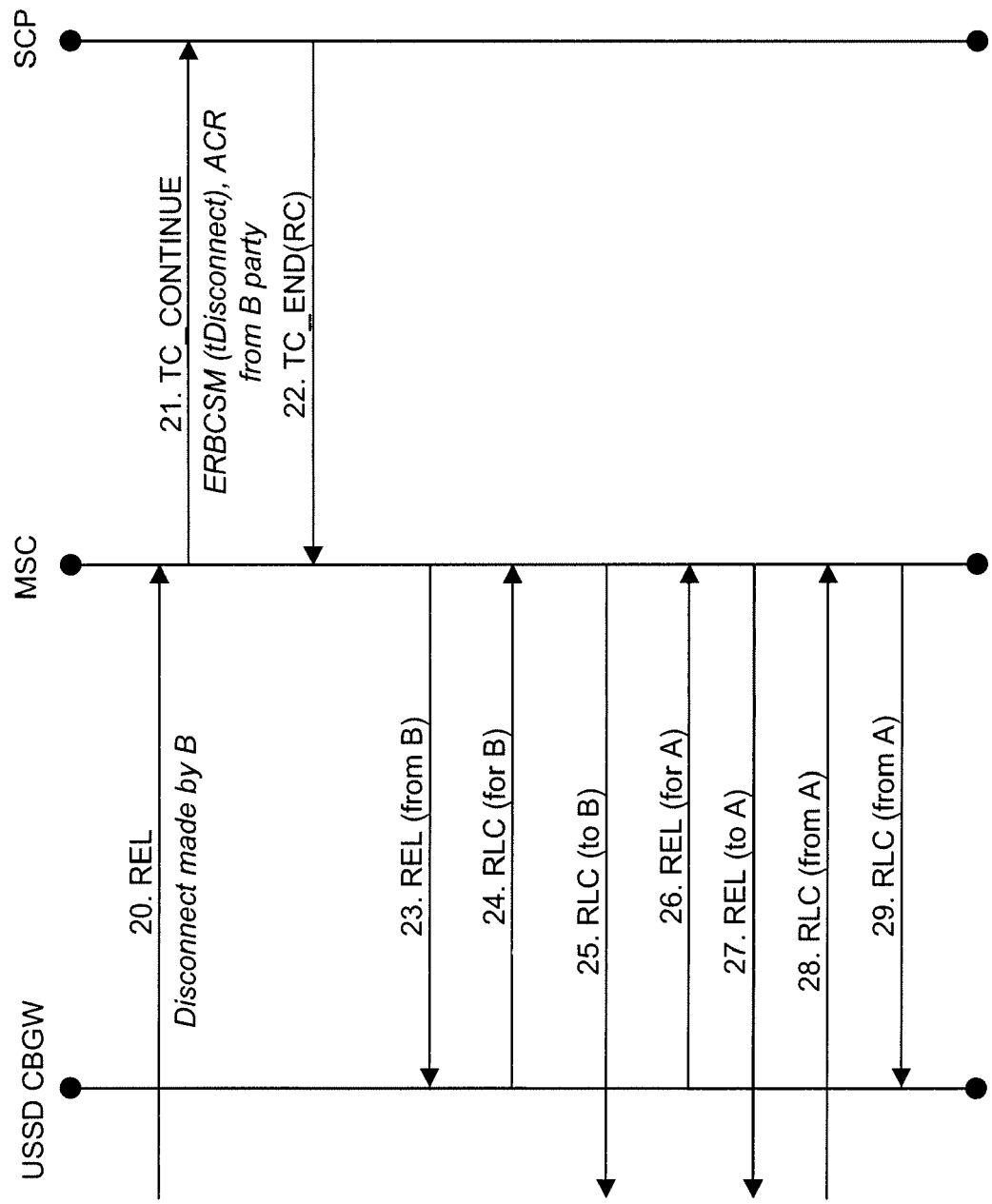

With reference to FIG. 3, at step 11 the CBGW 113 issues another IAM message to the MSC 107 in order to set up the second leg of the call. However, the IAM message instructs a call from the CBGW to the calling party A. The IAM message also includes the special code in the form of "Prefix2" which indicates eventually to the SCP that the calling party and called party should be exchanged when the second call leg is actually set up. In response to the IAM message, at step 12 the MSC 107 issues a Transaction Begin (TC_BEGIN) message to the SCP 109, which includes, as an argument, the Initial Detection Point (IDP). The IDP includes the location of the calling party. The TC_BEGIN message indicates to the SCP 109 the start of a transaction for the SCP 109 to monitor and control. The TC_BEGIN message identifies the transaction as the call between "Prefix2" and the calling party A. In response to this message, the SCP 109 monitors the call as a call between the CBGW 113 and the called party B and responds at step 13, with a Transaction Continue (TC_CONTINUE) message indicating the next message in the transaction. This message contains three further messages. Firstly, a request report (RRBE) message, which requests an indication from the MSC 107 when the call is answered or terminated. Secondly, an Apply Charging (AC) request for the MSC 107 to send a charging report to the SCP when the call is released. Thirdly, a Continue (CON) message indicating that the SCP completed the list of instruction to the MSC and that the call can go on. The SCP is arranged to reverse the parties in this CON message in response to the "Prefix2" data in the IAM command of step 11. As a result, the MSC 107 sets the second leg of the call up correctly as a call from the CBGW 113 to the called party B. At step 14, the MSC 107 passes the IAM message sent in step 11 by the CBGW 113 to the next MSC in the call set up process, with the parties reversed.

In steps 15 and 16 the CBGW 113 and the MSC 107 exchange ACM messages, which acknowledge that there are enough digits to route the call. Then at step 17 the CBGW 113 sends an ANM message to the MSC 107 indicating that the call from the CBGW 113 to the called party B has been answered. In response to this, the MSC 107 sends a report message (ERBCSM) to the SCP 109, which indicates that the call is answered. This report was requested by the RRBE message in step 13. At step 19, the ANM message from the CBGW 113 is acknowledged by the MSC 107.

The call then continues, being charged as a prepaid call. When the called party disconnects, a Release (REL) message is generated indicating that the call is closing. This REL message is received by the CBGW 113 and passed to the MSC 107 at step 20. In response to the REL message, the MSC 107 issues a TC_CONTINUE message at step 21 to the SCP 109. The TC_CONTINUE message includes an ERBCSM message indicating that the called part has disconnected (tDisconnect) and also indicates the duration of the call in an Apply Charging Report (ACR). The SCP uses the data in this report and the location data received in step 12 to update the balance for the calling party A in the SDB 111. The SCP also responds at step 22 with a TC_END message indicating the end of the transaction to the MSC 107. At steps 23 to 29, the CBGW, MSC and HPLMN exchange a series of Release (REL) and Release Confirmed (RLC) messages indicating that the call is closing and confirming the release of the resources associated to the call.

As will be understood by those skilled in the art, the protocols used in the above embodiment may be exchanged for other suitable or equivalent protocols. For example, the CAMEL protocol may be used in place of the ISUP protocol. Furthermore, it will be appreciated that the called party 117 may be attached to any other network instead of the home network. The prefix (Prefix2) used in the above embodiment provides an identifier that enables the SCP to distinguish and identify the first call leg or the second call leg. Other suitable identifiers include identity of the trunk used by the CBGW or an IDP parameter called the Service Key.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for managing a call in a telecommunications network, the method comprising the steps of:
   a) receiving an instruction from a calling device to establish a call to a destination;
   b) issuing a first command to connect a first call leg to said calling device;
   c) connecting said first call leg to said calling device;
   d) issuing a second command to connect a second call leg to said calling device;
   e) connecting said second call leg to said destination instead of said calling device; and
   f) connecting said first and second call legs to provide said call between said calling device and said destination.

2. A method according to claim 1 in which in step d) said command comprises location data representing the location of said device.

3. A method according to claim 2 comprising the further step of:

g) monitoring the duration of said second call leg for use in combination with said location data, for charging said connected call.

4. A method according to claim 1 in which said device is a roaming prepaid device.

5. A method according to claim 1 in which said instruction is a USSD Call-back instruction.

6. Apparatus for managing a call in a telecommunications network, the apparatus being operable to:
- receive an instruction from a calling device to establish a call to a destination;
- issue a first command to connect a first call leg to said calling device;
- connect said first call leg to said calling device;
- issue a second command to connect a second call leg to said calling device;
- connect said second call leg to said destination instead of said calling device; and
- connect said first and second call legs to provide said call between said calling device and said destination.

7. Apparatus according to claim 6 in which said second command comprises location data representing the location of said device.

8. Apparatus according to claim 7 being further operable to monitor the duration of said second call leg for use in combination with said location data, for charging said connected call.

9. Apparatus according to claim 6 in which said device is a roaming prepaid device.

10. A method according to claim 6 in which said instruction is a USSD Call-back instruction.

11. A method for managing a call in a telecommunications network in response to an instruction from a roaming prepaid device to establish a call to a destination, the method comprising the steps of:
- a) in response to a first command, connecting a first call leg to said calling device;
- b) in response to a second command, connecting a second call leg to said calling party, said second command including location data representing the location of said device;
- c) connecting said second call leg to said destination instead of said calling device; and
- d) monitoring the duration of said second call leg in combination with said location data to charge said call against said prepaid device.

12. A method for managing a call in a telecommunications network in response to an instruction from a roaming prepaid device to establish a call connection to a destination, the method comprising the steps of:
- a) issuing a first command for connecting a first call leg to said calling device;
- b) issuing a second command in the form of a command to connect a second call leg to said calling party, but said second command being arranged to connect said second call leg to said destination instead of said calling device;
- c) including location data representing the location of said device in said second command so as to enable charging said call against said prepaid device by monitoring the duration of said second call leg in combination with said location data; and
- d) issuing a bridging command for said first and second call legs so as to enable said call between said calling device and said destination.

13. Software arranged to enable a programmable device or group of such devices to carry out the method of claim 1.

* * * * *